United States Patent
Thorn (10) Patent No.: US 8,593,419 B2
(45) Date of Patent: *Nov. 26, 2013

(54) USING TOUCHES TO TRANSFER INFORMATION BETWEEN DEVICES

(75) Inventor: Ola Karl Thorn, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 251 days.

This patent is subject to a terminal disclaimer.

(21) Appl. No.: 12/979,516

(22) Filed: Dec. 28, 2010

(65) Prior Publication Data

US 2011/0102369 A1    May 5, 2011

Related U.S. Application Data (63) Continuation of application No. 11/736,119, filed on Apr. 17, 2007, now Pat. No. 7,884,805.

(51) Int. Cl.
    *G06F 3/041* (2006.01)
(52) U.S. Cl.
    USPC ............................ 345/173; 345/178
(58) Field of Classification Search
    USPC ............... 345/156, 173–184, 522; 178/18.01–18.05; 715/700, 705, 209; 382/187, 115; 710/8
    See application file for complete search history.

(56) References Cited

U.S. PATENT DOCUMENTS

| | | | |
|---|---|---|---|
| 5,765,176 A * | 6/1998 | Bloomberg | 715/209 |
| 5,986,224 A | 11/1999 | Kent | |
| 6,421,453 B1 * | 7/2002 | Kanevsky et al. | 382/115 |
| 6,630,928 B1 * | 10/2003 | McIntyre et al. | 345/173 |
| 6,898,299 B1 | 5/2005 | Brooks | |
| 6,963,334 B1 * | 11/2005 | Stevens et al. | 345/179 |
| 7,121,460 B1 | 10/2006 | Parsons et al. | |
| 7,532,122 B2 | 5/2009 | Aull et al. | |
| 7,643,010 B2 | 1/2010 | Westerman et al. | |
| 7,643,011 B2 | 1/2010 | O'Connor et al. | |
| 7,725,493 B2 * | 5/2010 | Saund | 707/797 |
| 7,796,010 B2 * | 9/2010 | Chuey | 340/5.23 |
| 8,107,599 B2 * | 1/2012 | Topiwala et al. | 379/88.17 |
| 8,194,045 B1 * | 6/2012 | Maloney et al. | 345/173 |

(Continued)

FOREIGN PATENT DOCUMENTS

| | | |
|---|---|---|
| EP | 1 244 043 | 9/2002 |
| EP | 1 406 428 | 4/2004 |

(Continued)

OTHER PUBLICATIONS

International Search Report with Written Opinion in PCT Application No. PCT/IB2007/054215, dated Jan. 2, 2008, 13 pages.

(Continued)

*Primary Examiner* — Prabodh M Dharia (74) *Attorney, Agent, or Firm* — Sreenivas Vedantam; Moore & Van Allen PLLC (57) ABSTRACT

A device may comprise a display and a processor. The processor may obtain a first set of one or more touches on a remote surface of a remote device based on a signal received on a communication link between the device and the remote device, receive information associated with the first set of one or more touches through the signal, detect a gesture on the display, and determine whether the information is to be used to obtain content based on the gesture.

20 Claims, 10 Drawing Sheets

(56) References Cited

U.S. PATENT DOCUMENTS

| | | |
|---|---|---|
| 2002/0082962 A1 | 6/2002 | Farris et al. |
| 2002/0097715 A1 | 7/2002 | Roerick |
| 2003/0079222 A1 | 4/2003 | Boykin et al. |
| 2003/0120936 A1 | 6/2003 | Farris et al. |
| 2004/0246372 A1 | 12/2004 | Megeid |
| 2004/0257202 A1 | 12/2004 | Coughlin et al. |
| 2005/0266919 A1 | 12/2005 | Rowe et al. |
| 2006/0026521 A1 | 2/2006 | Hotelling |
| 2006/0098899 A1* | 5/2006 | King et al. .................... 382/305 |
| 2006/0125804 A1 | 6/2006 | Kent |
| 2006/0195787 A1* | 8/2006 | Topiwala et al. ............. 715/700 |
| 2006/0197752 A1 | 9/2006 | Hurst et al. |
| 2006/0197753 A1 | 9/2006 | Hotelling |
| 2006/0199612 A1 | 9/2006 | Beyer, Jr. et al. |
| 2007/0026371 A1* | 2/2007 | Wood ............................ 434/317 |
| 2007/0057792 A1 | 3/2007 | Alden |
| 2007/0067104 A1 | 3/2007 | Mays |
| 2007/0070038 A1* | 3/2007 | Hoffberg et al. ............. 345/156 |
| 2007/0128899 A1 | 6/2007 | Mayer |
| 2007/0132733 A1 | 6/2007 | Ram |
| 2007/0177803 A1 | 8/2007 | Elias et al. |
| 2007/0180285 A1 | 8/2007 | Dembo |
| 2007/0187266 A1 | 8/2007 | Porter et al. |
| 2007/0257890 A1 | 11/2007 | Hotelling et al. |
| 2007/0266185 A1* | 11/2007 | Goddi et al. ...................... 710/8 |
| 2008/0019591 A1* | 1/2008 | Iwayama et al. ............. 382/187 |
| 2008/0167834 A1 | 7/2008 | Herz et al. |
| 2008/0191418 A1 | 8/2008 | Lutnick et al. |
| 2008/0235211 A1* | 9/2008 | Saund ................................ 707/5 |
| 2008/0250328 A1 | 10/2008 | Konttinen |
| 2008/0258042 A1 | 10/2008 | Krymski |
| 2008/0259042 A1 | 10/2008 | Thorn |
| 2009/0073191 A1* | 3/2009 | Smith et al. .................. 345/629 |

FOREIGN PATENT DOCUMENTS

| | | |
|---|---|---|
| GB | 2 317 092 | 3/1998 |
| JP | 06282375 A | 10/1994 |
| JP | 07262372 A | 10/1995 |
| JP | 10269021 | 10/1998 |
| JP | 2001134382 A | 5/2001 |
| WO | 2004/003801 | 1/2004 |
| WO | 2007026423 A1 | 3/2007 |

OTHER PUBLICATIONS

Press Releases: Nokia Mobile RFID kit as part of the Nokia Field Force Solution is now commercially available, Feb. 21, 2005, http://press.nokia.com/PR/200502/981601_5.html, 2 pages.

Nishiyama, S. et al.; Combining RFID Tag Reader with Mobile Phone: An Approach to Realize Everyone's Ubiquitous Appliances; 2006 International Symposium on Intelligent Signal Processing and Communication Systems (ISPACS2006), pp. 87-90.

Antoniou, Z et al.: Intuitive Service Discovery in RFID-enhanced networks; Proceedings of the First International Conference on Communication System Software and Middleware (COMSWARE 2006), Jan. 8-12, 2006, 5 pages.

Japanese Patent Office; First Office Action; Nov. 25, 2011; issued in Japanese Patent Application No. 2010-503604.

State Intellectual Property Office, P.R. China; Third Office Action; Mar. 21, 2012; issued in Chinese Patent Application No. 200780052516.9.

Mexican Intellectual Property Office; Office Action; Apr. 19, 2011; issued in Mexican Patent Application No. MX/a/2009/009208.

State Intellectual Property Office, P.R. China; Second Office Action; Jun. 9, 2011; issued in Chinese Patent Application No. 200780052516.9.

State Intellectual Property Office, P.R. China; Fourth Office Action; Sep. 25, 2012; issued in Chinese Patent Application No. 200780052516.9.

State Intellectual Property Office, P.R. China; Fifth Office Action; Apr. 9, 2013; issued in Chinese Patent Application No. 200780052516.9.

* cited by examiner

|  | TAPS | ONE-FINGER GESTURE | TWO-FINGER GESTURE | JOINT GESTURE | NON-JOINT GESTURE |
|---|---|---|---|---|---|
| FINGER SIZE | Y | Y | Y | Y | Y |
| FINGER SHAPE | Y | Y | Y | Y | Y |
| FINGER SPEED |  | Y | Y | Y | Y |
| CAPACITANCE | Y | Y | Y | Y | Y |
| TIME | Y |  |  | Y | Y |
| DISTANCE BETWEEN FINGERS |  |  | Y | Y | Y |
| PATTERN CONTINUITY |  |  |  | Y | Y |

USING TOUCHES TO TRANSFER INFORMATION BETWEEN DEVICES

RELEATED APPLICATION

This application is a continuation of the U.S. patent application Ser. No. 11/736,119, filed Apr. 17,2007, which is incorporated herein by reference.

TECHNICAL FIELD OF THE INVENTION

Implementations described herein relate to a user interface and in particular, to a user interface that uses touches to transfer information between devices.

DESCRIPTION OF RELATED ART

Many computer or communication devices rely on a keyboard or a keypad to provide part of a user interface. However, using the keyboard or keypad is often cumbersome and/or inconvenient. In addition, other devices that use touch screens to emulate a keyboard or a keypad may not show significant improvements over devices that use a keyboard or a keypad.

SUMMARY

According to one aspect, a method may comprise detecting a first set of one or more touches of a graphical object, transmitting information that is associated with the graphical object to a device that includes a touch screen, receiving the information with the device, accepting a second set of one or more touches on the touch screen, and using the second set of one or more touches to determine whether the information is valid.

Additionally, detecting a first set of one or more touches may include identifying a gesture formed by the first set of one or more touches.

Additionally, transmitting information may include encoding the information based on the gesture, and transmitting the information that is associated with the graphical object over a physical wireless communication link to the device.

Additionally, identifying a gesture may include measuring parameters associated with the gesture.

Additionally, measuring parameters may include at least one of measuring a duration of time to complete the gesture, measuring a size of a finger for each touch, measuring a speed of a finger movement, measuring changes in capacitance of the display, determining a shape of a finger for each touch, measuring distances between fingers, determining a fingerprint, or obtaining a three-dimensional image of a finger.

Additionally, identifying a gesture may include identifying the gesture as at least one of a one-finger gesture, a two-finger gesture, a continuous gesture, a discontinuous gesture, or as taps.

Additionally, the method may further comprise receiving a request for data that is referenced in the information, and sending the data in response to the request.

Additionally, sending the data in response to the request may include sending the data over a communication link that is different from a wireless communication link over which the information is transmitted.

Additionally, the method may further comprise receiving a payment at an account in response to sending the data.

According to another aspect, a device may comprise a touch screen and a processor. The processor may be configured to detect one or more touches on a remote radio-frequency identification (RFID) tag, receive information from the remote RFID tag over a signal transmitted from the remote RFID tag if the one or more touches are detected, identify a gesture on the touch screen, and access the information if the gesture on the touch screen validates the information.

Additionally, the remote RFID tag may include one of a passive RFID tag or an active RFID tag.

Additionally, the device may further comprise a RFID receiver for receiving the information.

Additionally, the processor may be further configured to send a request for data whose link is provided in the information, and receive the data.

Additionally, the processor may be further configured to transfer a payment to an account in exchange for receiving the data.

Additionally, the processor may be further configured to receive a discount coupon.

Additionally, the processor may be further configured to decode the information based on the gesture on the touch screen.

According to yet another aspect, a device may comprise a display and a processor. The processor may obtain a first set of one or more touches on a remote surface of a remote device based on a signal received on a communication link between the device and the remote device, receive information associated with the first set of one or more touches through the signal, detect a gesture on the display, and determine whether the information is to be used to obtain content based on the gesture.

Additionally, the remote device may include a passive radio-frequency identification (RFID) tag.

Additionally, the remote surface may include a surface of a touch screen.

Additionally, the information may include a link to data at a content provider.

According to a further aspect, a device may comprise means for receiving information that is transmitted from a remote device and is associated with a graphical object at a remote display included in the remote device, means for detecting a gesture on a local display, means for decoding the information based on the gesture, and means for deleting the information if the means for decoding the information fails to decode the information within a predetermined amount of time.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements.

The term "touch," as used herein, may refer to a touch of a finger or a body part. A touch may be deemed to have occurred if a sensor detects a touch, by virtue of the proximity of the body part to the sensor, even if the physical contact has not occurred. The term "touch screen," as used herein, may refer not only to a touch-sensitive screen, but a screen that may signal a touch when the finger or the body part is close to the screen (e.g., a capacitive screen, a near field screen).

Figure 1:
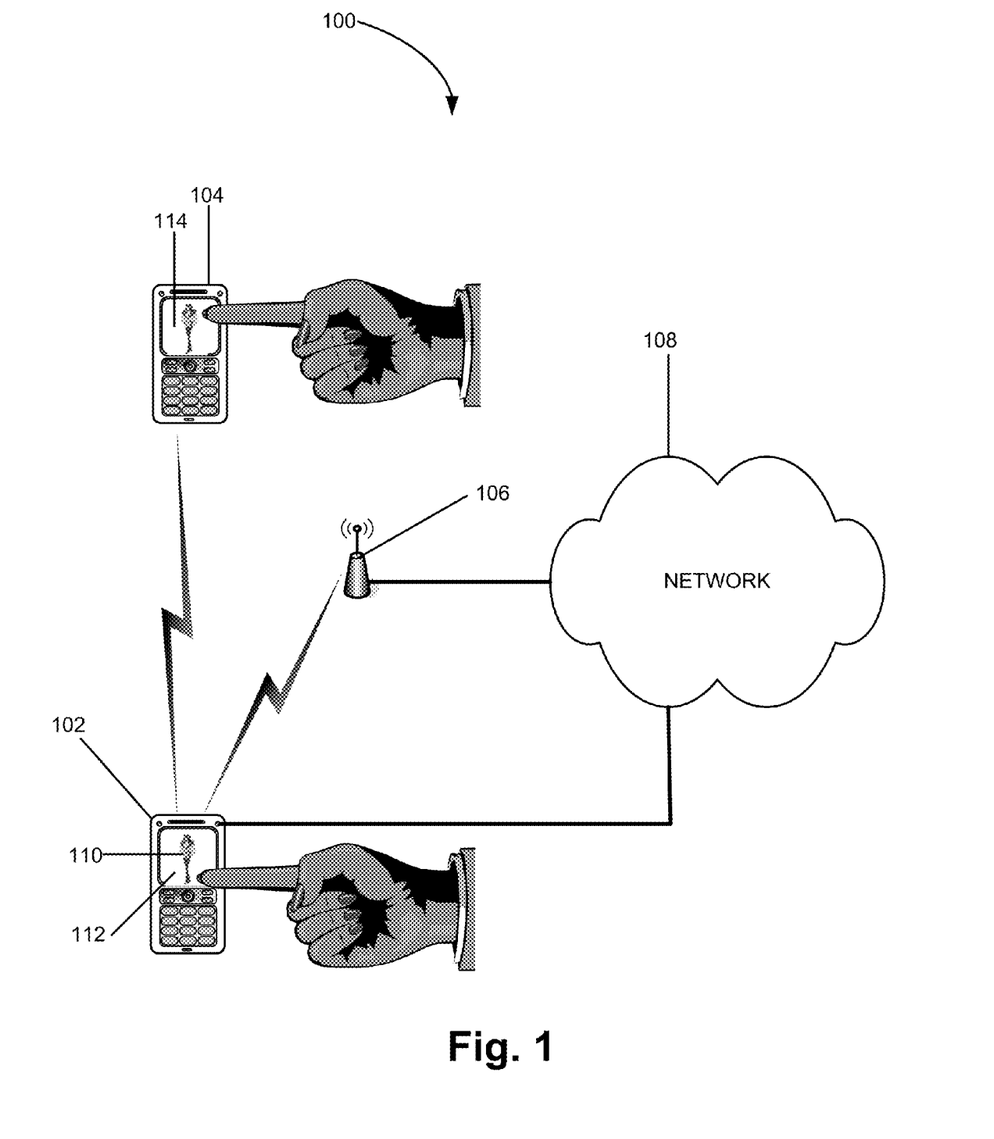
FIG. 1 shows a system in which concepts described herein may be implemented.

In implementations described herein, touches may be used to transfer information between different devices. FIG. 1 shows an exemplary system that includes one implementation of concepts described herein. As shown, system 100 may include device 102 and 104, a wireless access point (WAP) 106 and a network 108. In other implementations, system 100 may include more, fewer, or different components. Moreover, one or more components of system 100 may perform one or more functions of another component of system 100.

Each of devices 102/104 may include any of the following devices: a radio-frequency identification (RFID) tag; a RFID receiver; a touch screen; a gaming console (e.g. Nintendo Dual Screen (DS)); a telephone, such as a radio telephone; a personal communications system (PCS) terminal that may combine cellular radiotelephone with data processing, facsimile, and/or data communications capabilities; a mobile telephone; an electronic notepad; a laptop; a personal computer (PC); a personal digital assistant (PDA) that can include a radiotelephone, pager, Internet/intranet access, web browser, organizer, calendar, GPS receiver, RFID tag, and/or RFID receiver, touch screen; or another type of computation or communication device, a thread or process running on one of these devices, and/or an object executable by one of these devices.

WAP 106 may include a device for accessing network 108, such as a router that is able to receive and transmit wireless and/or wired signals, or any other device that provides access to a network. WAP 106 may communicate with device 102 using any wireless communication protocol. Devices 102/104 may connect to network 108 via WAP 106. In other implementations, devices 102/104 may connect to network 108 via wired and/or wireless connections.

Network 108 may include the Internet, an ad hoc network, a local area network (LAN), a wide area network (WAN), a metropolitan area network (MAN), a cellular network, a public switched telephone network (PSTN), any other network, or combinations of networks.

As further shown in FIG. 1, if a user wishes to transfer a piece of information (e.g., a picture 110) from device 102 to device 104, the user may touch display 112 or part of device 102. In one implementation, the touch may cause device 102 to encode and transmit the information to device 104. If device 104 receives the information, the user may touch display 114 of device 104 to decode and access (e.g., view) the information.

Exemplary Device

Figure 2:
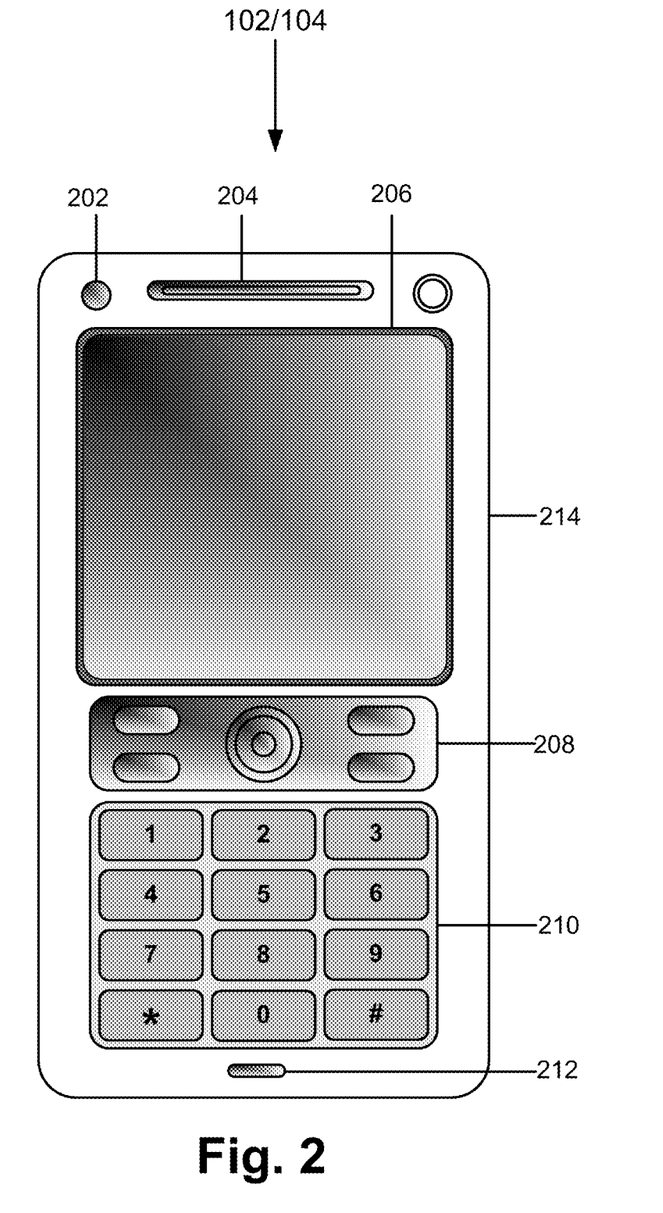
FIG. 2 is an exemplary diagram of one of the devices of FIG. 1.

FIG. 2 is an exemplary block diagram which may correspond to one of devices 102/104. As illustrated, device 102/104 may include a camera 202, a speaker 204, a display 206, control buttons 208, a keypad 210, a microphone 212, and a housing 214. Camera 202 may enable a user to view, capture and store media (e.g., images, video clips) of a subject in front of device 102/104. Speaker 204 may provide audible information to a user of device 102/104. Display 206 may include a display screen to provide visual information to the user, such as video images or pictures, and may include a touch screen (e.g., a capacitive screen, near field screen) to accept inputs from a user. Control buttons 208 may permit the user to interact with device 102/104 to cause device 102/104 to perform one or more operations, such as place or receive a telephone call. Keypad 210 may include a standard telephone keypad. Microphone 212 may receive audible information from the user. Housing 214 may provide a casing for components of device 102/104 and may protect the components from outside elements.

Figure 3:
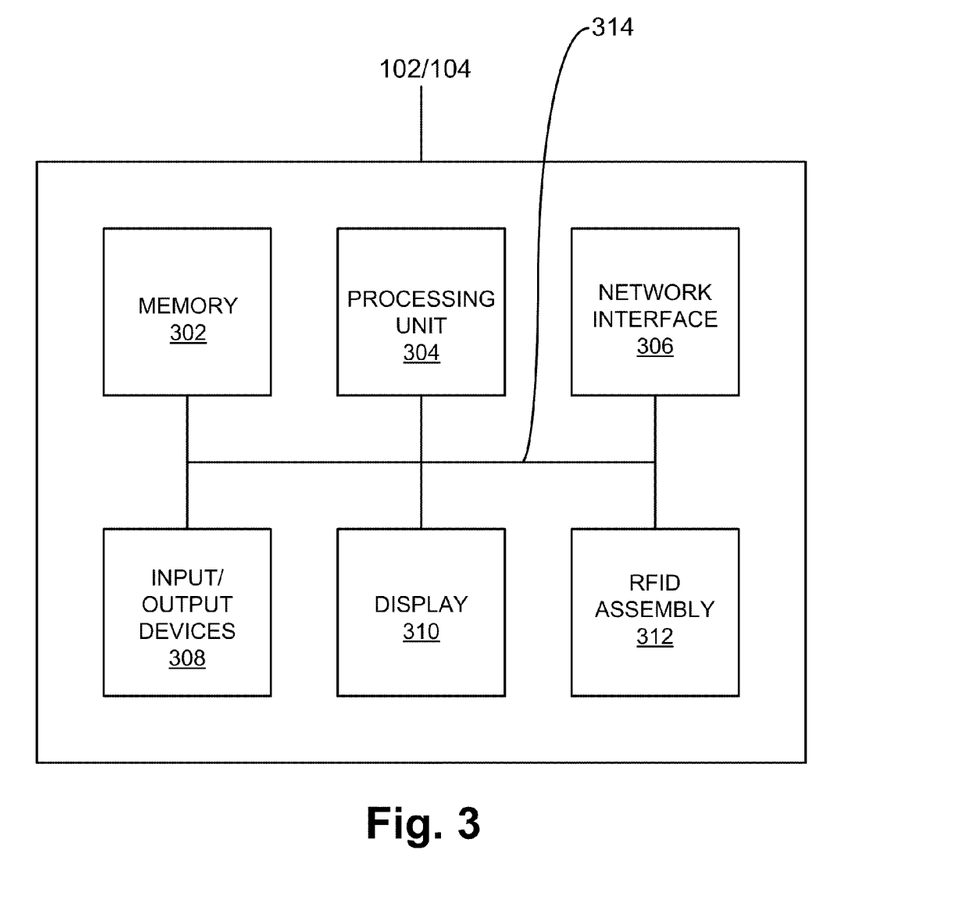
FIG. 3 is an exemplary block diagram of the device of FIG. 2.

FIG. 3 shows an exemplary block diagram of device 102/104 of FIG. 2. As shown, device 102/104 may include memory 302, a processing unit 304, a network interface 306, input/output devices 308, a display 310, a RFID assembly 312 and a bus 314. In other implementations, device 102/104 may include more, fewer, or different components. For example, if device 102/104 includes a digital camera, device 102 may include a lens assembly and/or image sensors.

Memory 302 may include static memory, such as read only memory (ROM), and/or dynamic memory, such as random access memory (RAM), or onboard cache, for storing data and machine-readable instructions. Memory 302 may also include storage devices, such as a floppy disk, CD ROM, CD read/write (R/W) disc, and/or flash memory, as well as other types of storage devices. Processing unit 304 may include one or more processors, microprocessors, and/or processing logic capable of controlling device 102/104. Network interface 306 may include any transceiver-like mechanism that enables device 102/104 to communicate with other devices and/or systems. For example, network interface 306 may include mechanisms for communicating via a network, such as the Internet, a terrestrial wireless network (e.g., wireless local area network (WLAN)), a satellite-based network, etc. Additionally or alternatively, network interface 306 may include a modem, an Ethernet interface to a local area network (LAN), a, and/or an interface/ connection for connecting device 102/104 to other devices (e.g., a Bluetooth interface). Further, network interface 306 may include receivers, such as a Global Positioning System (GPS) receiver. Input/output devices 308 may include a keyboard, a keypad (e.g., keypad 210 of FIG. 2), a button (e.g., control buttons 208), a mouse, a speaker (e.g., speaker 204), a microphone (e.g., microphone 212), a Digital Video Disk (DVD) writer, a DVD reader, Universal Serial Bus (USB) lines, and/or other types of devices for converting physical events or phenomena to and/or from digital signals that pertain to device 102/104.

Display 310 may include a device that can display signals generated by device 102/104 as images on a screen (e.g., a liquid crystal display (LCD), cathode ray tube (CRT) display, organic light-emitting diode (OLED) display, surface-conduction eletro-emitter display (SED), plasma display, field emission display (FED), bistable display, etc.) and a touch screen or a panel-enabled display that may function as a user input interface. For example, display 310 may include a pressure-sensitive (e.g., resistive), near field-sensitive (e.g., capacitive), acoustically-sensitive (e.g., surface acoustic wave), photo-sensitive (e.g., infra-red), and/or any other type of display overlay that allows display 310 to be used as an input device. In other examples, display 310 may include an accelerometer to detect a touch by sensing minute surface accelerations or a camera to detect a touch. In yet another example, display 310 may include a device for measuring minute changes in the tilting angles of its surface to detect a touch.

RFID assembly 312 may include a RFID tag for storing and transmitting data for identification and/or a RFID receiver for reading or receiving data from a remote RFID tag. The RFID tag may be either passive or active. A passive tag may not include an internal power source, and may send identifying information by backscattering a carrier signal from a RFID receiver. An active tag may have an internal power source that is used to generate an identifying signal. In different implementations, in place of RFID assembly 312, device 102/104 may include a wireless receiver to receive a signal from a remote device when the remote device is touched, so that device 102/104 may detect the touch.

Bus 314 may provide an interface through which components of device 102 can communicate with one another.

Figure 4:
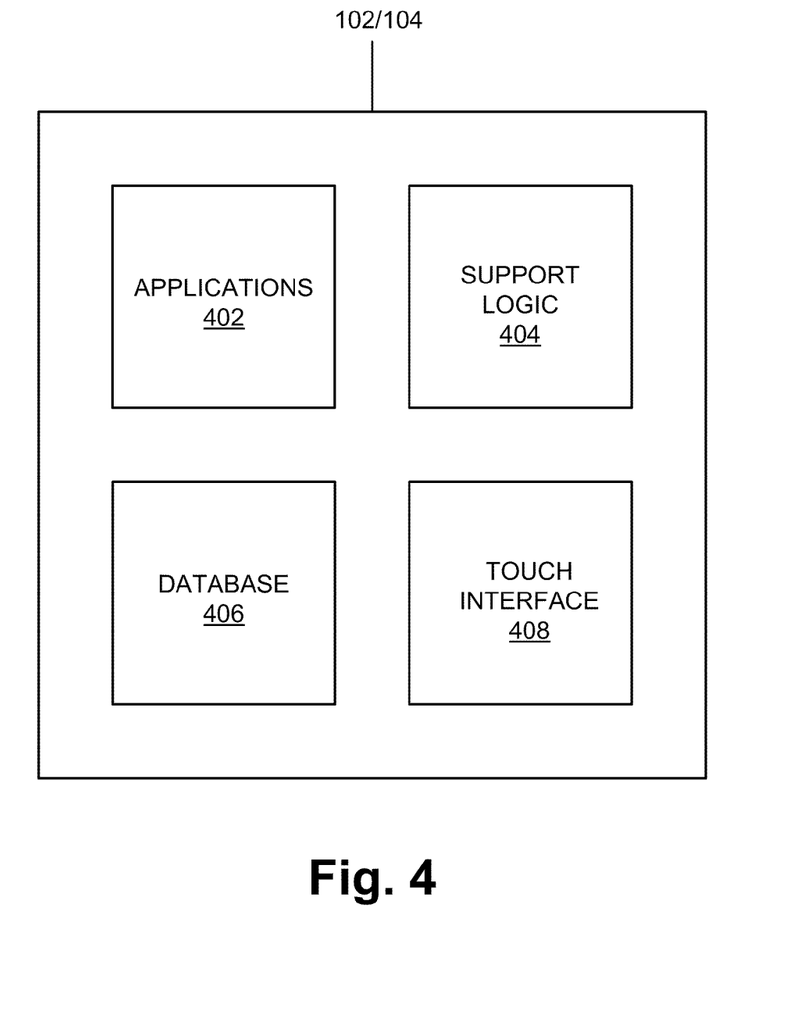
FIG. 4 is an exemplary functional block diagram of exemplary components that may be included in the device of FIG. 2.

FIG. 4 is an exemplary functional block diagram of exemplary components that may be included in device 102/104. As shown, device 102/104 may include applications 402, support logic 404, a database 406, and a touch interface 408. In other implementations, device 102/104 may include fewer, additional, or different types of components than those illustrated in FIG. 4.

Applications 402 may include hardware and/or software for supporting various functionalities of device 102/104, such as text messaging, email, Multimedia Messaging, wireless communications (e.g., Bluetooth), image capturing and storing, infrared communications, web access, file uploading and downloading, image transfer, etc.

Support logic 404 may include hardware and/or software for performing various support functions for applications 402, database 406, and touch interface 408. For example, support logic 404 may provide interfaces between the components illustrated in FIG. 4 (e.g., applications 402 and touch interface 408) and the components in FIG. 3 (e.g., network interface 306, input/output devices 308, and display 310). In yet another example, support logic 404 may provide a TCI/IP stack to support communication applications.

Database 406 may act as an information repository for applications 402, support logic 404, and/or touch interface 408. For example, applications 402 may store and/or retrieve email, text, and/or sounds to and within/from database 406. In another example, touch interface 408 may retrieve and/or store images at database 406.

Touch interface 408 may include hardware and/or software that receive inputs from display 310 in the form of touches. Furthermore, in response to touches, touch interface 408 may cause processing unit 304 (FIG. 3) to accept and/or transmit information (e.g., a video, a picture, a piece of music, a link, a text, a document, etc.) to and/or from a remote device. In one implementation, touch interface 408 may cause the completion of a transaction (e.g., a purchase) that is associated with receiving the information from the remote device, by making a withdrawal from an electronic wallet/account of the user.

Exemplary Process for Using Touches to Transfer Information

Figure 5:
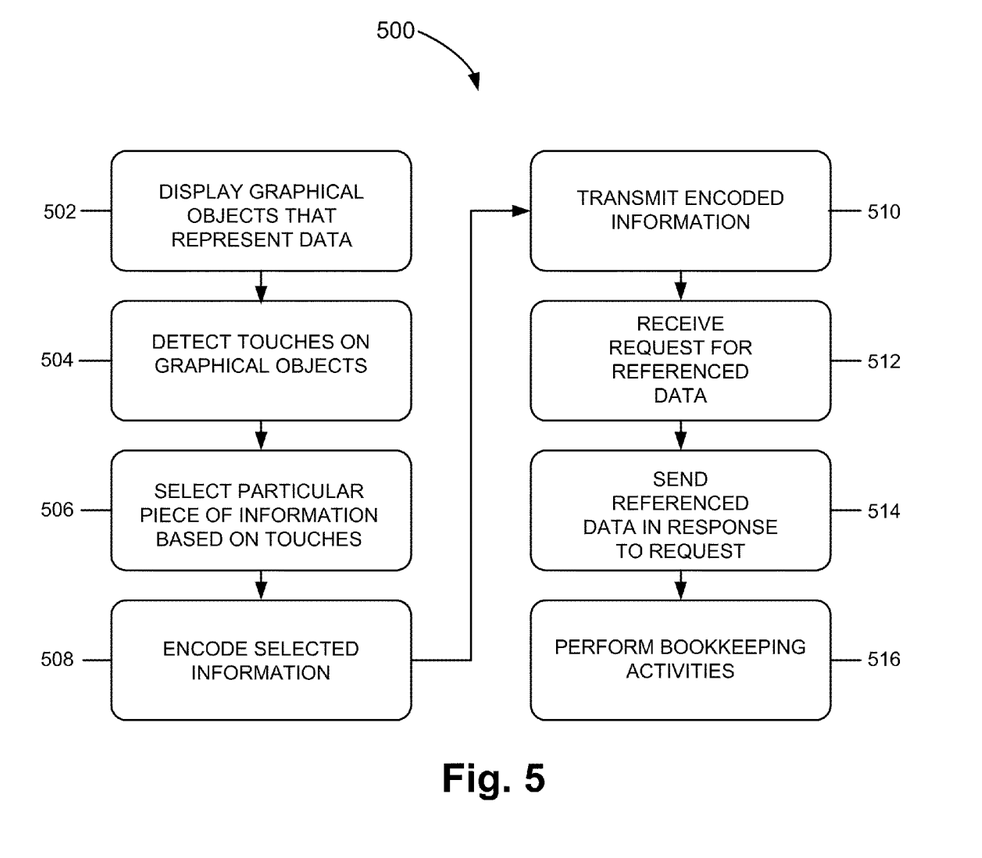
FIG. 5 shows a flowchart of an exemplary process for using touches to send information.

FIG. 5 shows an exemplary process 500 for using touches to send information. Process 500 may start at block 502, where graphical objects that represent data may be displayed at a device. The graphical objects may show data itself (e.g., a picture) or may reference the data (e.g., an icon, a link, etc.).

At block 504, touches on the graphical objects may be detected. Detecting the touches may include determining a pattern that is formed by the touches. The pattern may be used as a key for validating transactions or to encode and/or decode information that is transmitted and/or received at different devices. The pattern may be shared between different parties, and a user that supplies the pattern for encoding may not be the user that provides the pattern for decoding the information.

Figure 6A:
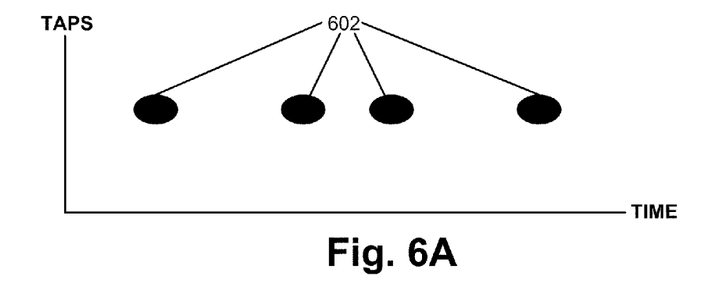
FIG. 6A shows an exemplary touch pattern as a function of time.
Figure 6B:
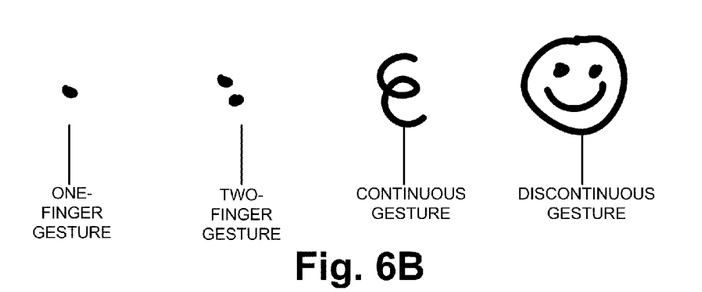
FIG. 6B shows exemplary touch patterns on the surface of a display.

FIGS. 6A and 6B show different types of patterns that may be determined. In one implementation, the patterns may be determined based on statistical models, such as a hidden Markov model. FIG. 6A shows a pattern as a function of time. As illustrated, a pattern 602 may include a number of taps. Each tap may arrive at one or more locations on an input screen and may be separated from the next tap by a time period.

FIG. 6B shows touch patterns on a surface (e.g., surface of a display). As illustrated, the surface touch patterns may include a one-finger gesture, a two-finger gesture, a continuous gesture, or a discontinuous gesture. As implied by the terms, a one-finger gesture and a two-finger gesture may be formed by one and two fingers, respectively. A continuous gesture may be formed by a touch that moves against an input surface without a break, and a discontinuous gesture may be formed by multiple touches, with breaks from the surface between the touches. If used as a key, the leftmost gesture (i.e., one-finger gesture) provides the lowest level of security among those illustrated, and the rightmost gesture provides the highest level of security. In different implementations, the touch patterns may include patterns that involve additional fingers (e.g., a three-finger touch) or a different part of human body (e.g., palm of hand).

Figure 6C:
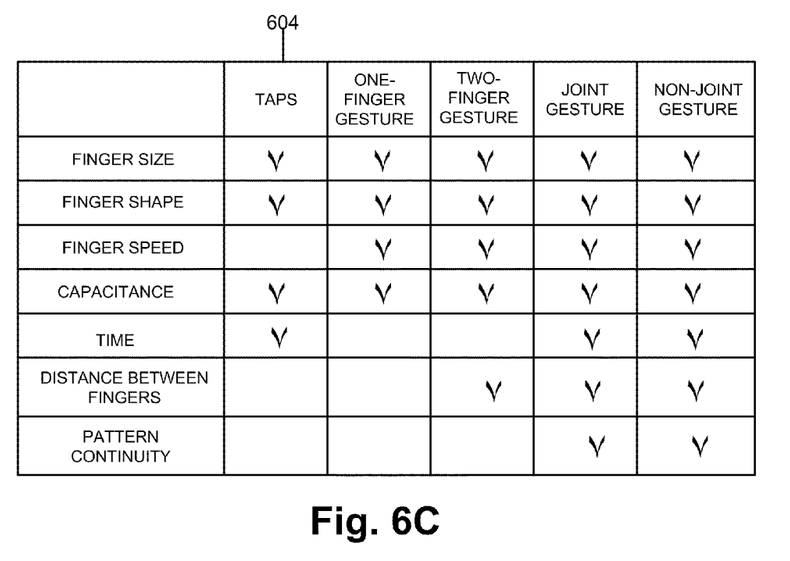
FIG. 6C illustrates a table that may include different types of parameters that may be obtained for each of the patterns that are shown in FIG. 6A and FIG. 6B.

FIG. 6C illustrates a table that may include different types of parameters (i.e., items on the leftmost column of a table 604) that may be obtained for each of the patterns that are illustrated in FIG. 6A and FIG. 6B. As shown, the parameters may include finger size (i.e., size of a contact area on an input surface), finger shape (i.e., shape of a contact area), finger speed, capacitance (i.e., change in capacitance at an input surface if a body part is close to the surface), time (i.e., the amount of time taken to complete the pattern), distance between fingers, and/or pattern continuity (i.e., a number of breaks between touches that form a pattern). The capacitance may depend on a particular touch screen that is used as an input display, and the distance between fingers may depend on a specific gesture. In addition, FIG. 6C shows, for each pattern (i.e., an item in the top row of table 604), whether a particular parameter may be extracted and used as part of an encryption/decryption key for encoding or decoding the information that is represented by the graphical objects. For example, in FIG. 6C, a checkmark may indicate that finger size may be used to derive a sequence of characters that can be used form an encryption key. In different implementations, other parameters may be obtained from the touch patterns, such as fingerprints, three-dimensional impression of fingers or hands, etc.

Returning to FIG. 5, at block 506, a particular piece of information may be selected based on the touches. In one implementation, the selected information may be data that is represented by the graphical objects. For example, if the touches are on an icon that represents a text document or on a window that shows the text document, the text document may be selected. In other implementations, the selected information may include a reference to the data (e.g., a link or a Universal Resource Locator (URL)).

At block 508, the selected information may be encoded. In one implementation, the encoding may be performed by using an encryption key that is formed from the parameters shown in FIG. 6C.

At block 510, the encoded information may be transmitted. In one implementation, the information may be transmitted over short range radio waves (e.g., Bluetooth, WLAN) to all nearby devices. In other implementations, the information may be transmitted via different communication mechanisms. For example, in one implementation, the information and location information obtained from a GPS receiver may be transmitted through a wireless telephone line to a network. The network may locate all the nearby devices based on the location information and send the information to the nearby devices.

If the transmitted information includes the data represented by the graphical objects, process 500 may terminate at block 510. In such instances, at a nearby device, the user may provide confirmation touches (i.e., touches that confirm the user's intention to transfer the information). At the nearby device, a pattern associated with the confirmation touches may be identified and used as a key to decode the information. If a nearby device receives the information, but is not provided with the confirmation touches within a predetermined time period, the nearby device may delete the encoded information.

If the transmitted information includes a reference to the data in place of the data represented by the graphical objects, process 500 may continue, depending on which nearby device receives the transmitted information. If the nearby device that receives the information is provided with confirmation touches within a prescribed time, the nearby device may send a request for the data that is referenced in the information.

In different implementations, the confirmation touches may not be provided by the user that initiated an information transfer at block 504, but may be provided by another user who may share a particular touch pattern that is used to encode the information. For example, a device that receives the information may accept confirmation touches only from the owner of the device and may decode the received information if the owner provides the pattern that is used to encode the received information.

At block 512, the request from the nearby device may be received. Depending on the implementation, the request may be received through a communication channel or a link that is different from the channel or the link that is used for transmitting the encoded information at block 510. For example, the encoded information may be transmitted through a Bluetooth communication channel, and the request may be received through a WLAN. In another example, if the device that sends the encoded information and the nearby device are on a wired LAN, the request may be made through the wired LAN. In other implementations, if the reference indicates that the data is not on device 102 but on a remote server, the server may receive the request through appropriate communication channel.

At block 514, the referenced data may be sent to the nearby device in response to the request. The referenced data may be sent over the communication channel that is used for receiving the request. Depending on the level of security afforded by the channel, the referenced data may or may not be encoded. If the referenced data does not reside on device 102 but on a server, the server may send the referenced data to the nearby device upon receiving the request.

At block 516, bookkeeping activities may be performed. For example, if the information received at the nearby device includes the references to data, the information may be deleted from the nearby device. In another example, if receiving the referenced data involves a monetary transaction, proper accounts (e.g., the account of the user that received a movie, a picture, etc.) may be charged.

Alternative Implementation

Figure 7:
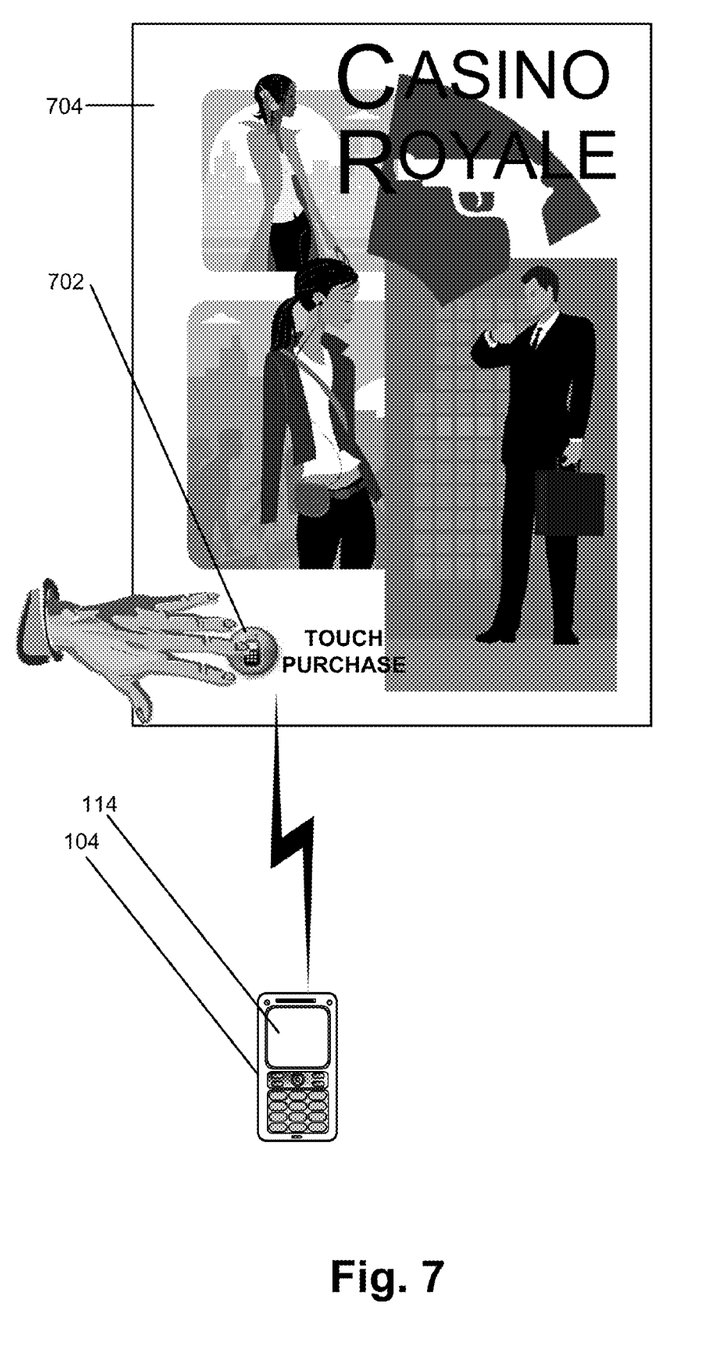
FIG. 7 illustrates an alternative implementation of the concepts described herein.

FIG. 7 illustrates an alternative implementation of the concepts described herein. In the alternative implementation, a passive RFID tag 702 may take a role similar to that of device 102 in FIG. 1. In FIG. 7, if passive RFID tag 702 is touched, nearby device 104 may detect the touch based on a signal from passive RFID tag 702 and may temporarily store a piece of information that is transmitted from passive RFID tag 702. If the user touches display 114 to confirm the user's intention to obtain data (i.e., a movie), device 104 may automatically download the data from a content provider in network 106. The network address of the content provider may be included in the piece of information that is transmitted from passive RFID tag 702.

Figure 8:
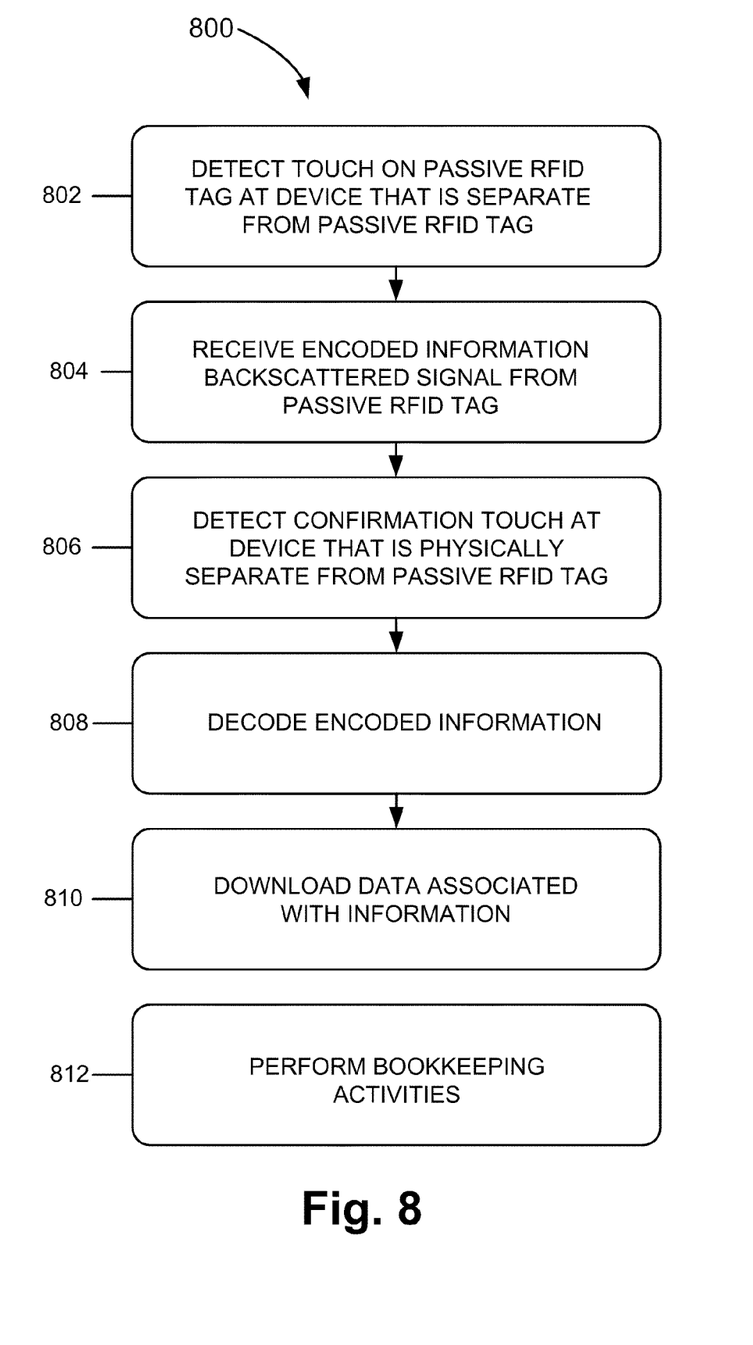
FIG. 8 shows a flowchart of another exemplary process for using touches to receive information.

FIG. 8 shows a flowchart of an exemplary process 800 for the alternative implementation for using touches to receive information. Process 800 may start at block 802, where a touch on a passive RFID tag may be detected at a device that is separate from the passive RFID tag. For example, in FIG. 7, a user carrying device 104 inside her purse (not shown) may approach a poster 704 that advertises a movie. As the user approaches poster 704, a signal from RFID assembly 312 (FIG. 3) in device 104 may be backscattered (e.g., reflected back) by passive RFID tag 702 that is located on poster 704. If the user decides to purchase a movie that is advertised, the user may touch passive RFID tag 702. Device 104 may detect the touch at RFID tag 702 by capturing a strength profile of the backscattered signal and by comparing the profile to a known graph of passive RFID tag signal strength.

Figure 9:
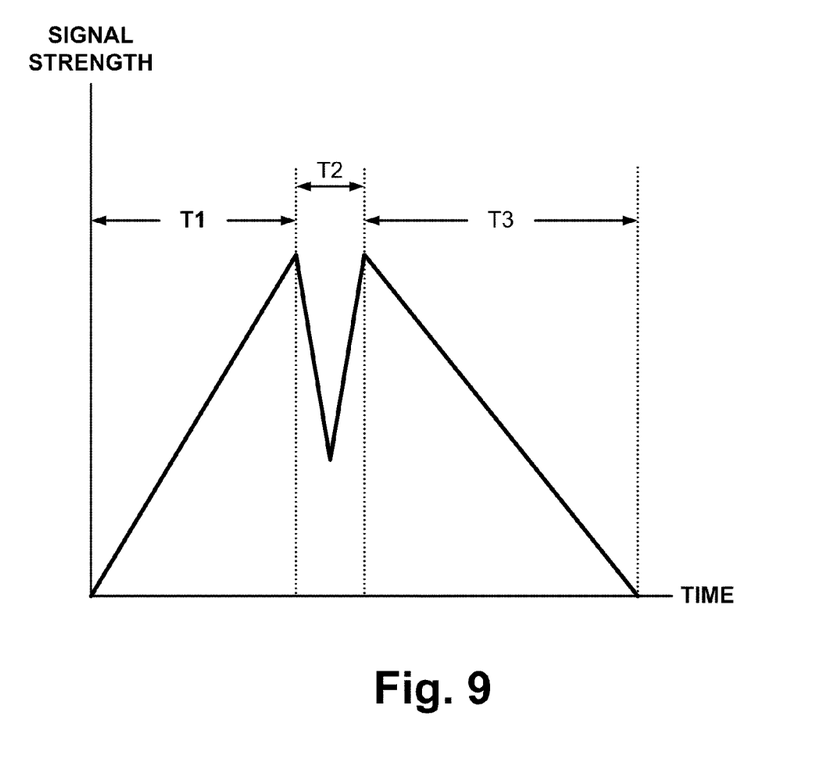
FIG. 9 shows an exemplary graph of the strength of a signal from a passive radio-frequency identification (RFID) tag that is touched.

FIG. 9 shows an exemplary graph of the strength of a signal from a passive RFID tag that is touched. As a user that carries RFID assembly 312 approaches the passive RFID tag, the signal strength may increase (e.g., region T1 in FIG. 9); if the user's hand or an extremity touches and partly covers the passive RFID tag, the signal strength may drop abruptly (e.g., region T2) due to an occlusion of the passive RFID tag; if the user's hand moves away from the passive RFID tag, the signal may regain the previous strength level; and the signal strength may gradually decrease if the user and the RFID receiver move away from the passive RFID tag.

Returning to FIG. 8, at block 804, encoded information in the form of a backscattered signal may be received from the passive RFID tag. In one implementation, the received information may include the data (e.g., a video clip) that the user wishes to obtain. In other implementations, the received information may include a reference to a content provider in a network that is accessible by the device that is separate from the passive RFID tag.

At block 806, confirmation touches may be detected at the device that is physically separate from the passive RFID tag. Detecting the touches may include determining a pattern that is formed by the touches, as discussed above with respect to process 500. If the confirmation touches are not detected at the device within a prescribed time, the information may be removed from the device.

At block 808, the received information may be decoded based on the confirmation touches. If the received information includes the data that the user wishes to obtain, process 800 may terminate at block 808. If the transmitted information includes a reference to the data in place of the data itself, process 800 may download the data at block 810.

Depending on the implementation, the data may be received through a communication channel that is different from the channel that is used for receiving the encoded information at block 804. For example, the encoded information may be transmitted through a specific RFID channel, and the data may be received through a wireless telephone channel. In another example, if the device is on a wired/wireless LAN, the request may be made through the wired/wireless LAN.

At block 812, bookkeeping activities may be performed. For example, if the information received at the device includes the references to data, the information may be deleted from the device. In another example, if receiving the referenced data involves a credit or a payment, proper accounts (e.g., the account of the user that received a movie, a picture, etc.) may be charged or credited. If the credit is provided in the form of a discount coupon, the coupon can be used when the data is purchased.

EXAMPLE

Figure 10A:
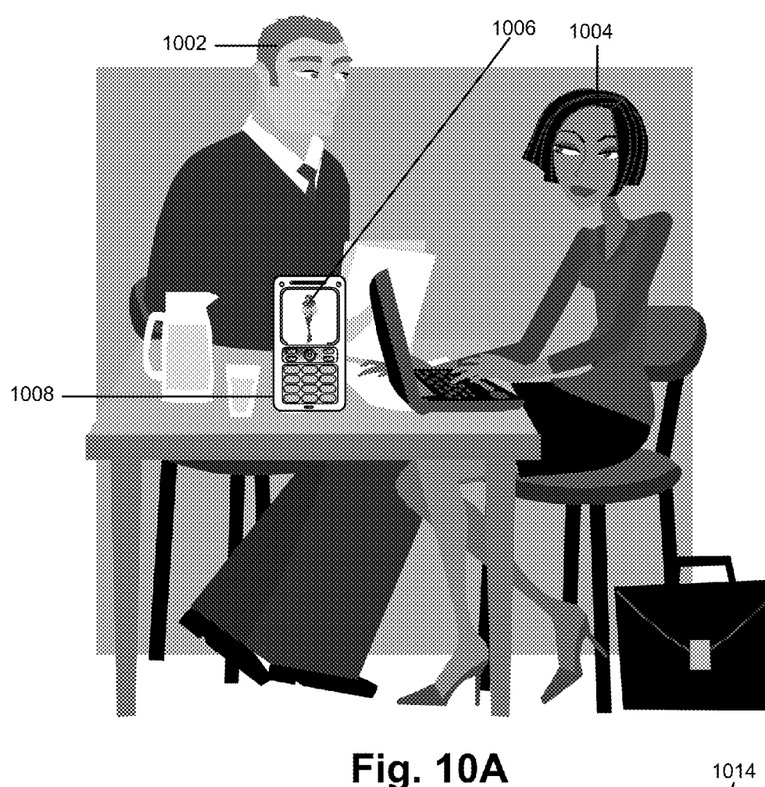
FIGS. 10A-10C illustrate an exemplary implementation of the exemplary process of FIG. 8.
Figure 10B:
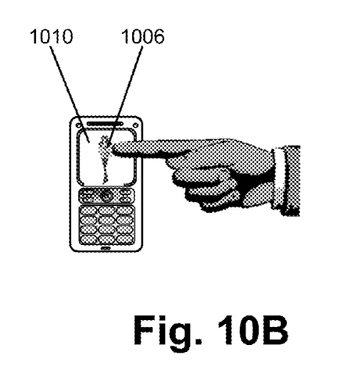
Figure 10C:
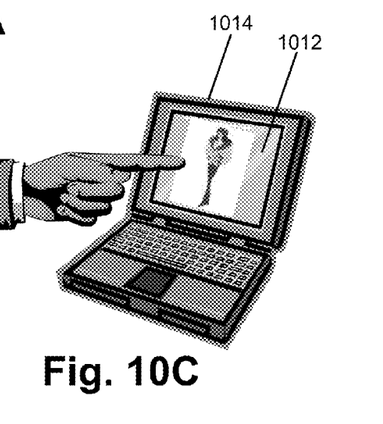

The following example illustrates processes involved in using touches to transfer information, as depicted in FIG. 10A-C. The example is consistent with the exemplary process described above with reference to FIG. 5.

In FIG. 10A, assume that Ola 1002 and Jane 1004 are looking at a picture 1006 of Jane on Ola's phone 1008. Jane 1004 comments, "Gee, this photo from Ibiza is outrageous. I don't remember that I actually wore that hat! I must have that picture!" Ola 1002 answers, "No problem." Ola 1002 touches Jane's picture 1006 on a display 1010 of phone 1008 with his hand. FIG. 10B illustrates Ola 1002 touching Jane's picture 1006 on display 1010. If Ola 1002 touches a display 1012 of Jane's notepad 1014, Jane's picture 1006 may be shown on display 1012. FIG. 10C illustrates Ola 1002 touching display 1012 of notepad 1014 to complete the transfer of Jane's picture 1006.

In the example, if Ola 1002 touches display 1010, Jane's picture 1006 may be selected and encoded based on a specific gesture that accompanies Ola's touch. The encoded picture may be transmitted to Jane's notepad 1014, which temporarily stores Jane's picture 1006 for a prescribed amount of time (e.g., thirty seconds). If Jane 1004 touches display 1012 of her notepad 1014 with the same specific gesture that Ola 1002 uses, Jane's picture 1006 may be decoded based on the gesture and shown on display 1012.

Conclusion

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIGS. 5 and 8, the order of the blocks may be modified in other implementations. For example, block 516 may be performed prior to block 512. If encoded information that is transmitted from a device based on a touch is data itself rather than a reference to the data, blocks 512 and 514 may be omitted. If sending the encoded data does not involve a payment, block 516 may be omitted. Similarly, block 810 may be omitted if the encoded information is data itself, and block 812 may be omitted if receiving the data does not involve a payment. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
   encrypting data, at a first device, based on at least one first characteristic relating to a first pattern produced on a touch screen of the first device, where the first pattern is produced by a first user;
   transmitting, using the first device and to a second device, the encrypted data;
   storing the encrypted data for a predetermined period of time at the second device;
   decrypting, using the second device, the encrypted data based on at least one second characteristic relating to a second pattern produced on a touch screen of the second device, and based on determining the second pattern substantially matches the first pattern, where the second pattern is produced by a second user; and
   displaying the decrypted data in a decrypted format on the touch screen of the second device.

2. The method of claim 1, where the at least one first characteristic or the at least one second characteristic includes at least one of:
   a size of a finger used to form the first pattern or the second pattern;
   a speed of a finger movement used to form the first pattern or the second pattern;
   changes in capacitance of the display;
   a shape of a finger used to form the first pattern or the second pattern;
   distances between fingers used to form the first pattern or the second pattern;
   a fingerprint; or
   a three-dimensional image of a finger.

3. The method of claim 1, where the first pattern includes at least one of:
   a pattern formed using one finger,
   a pattern formed using two fingers,
   a continuous pattern, or
   a discontinuous pattern.

4. The method of claim 1, where a level of encryption is based on a complexity of the first pattern.

5. The method of claim 1, further comprising:
   deleting the encrypted data from the second device, if the second device fails to detect the second pattern within the predetermined period of time.

6. The method of claim 1, where decrypting the encrypted data, based on at least one second characteristic relating to a second pattern produced on a touch screen of the second device, further comprises:
   decrypting the encrypted data based on the at least one first characteristic matching the at least one second characteristic.

7. A method performed by a device, the method comprising:
   receiving, by the device and from a second device, encrypted data, where the encrypted data is encrypted based on one or more parameters associated with a gesture produced by a first user on a display of the second device;
   storing the encrypted data for a predetermined period of time at the device;
   measuring, using the device, one or more parameters associated with a gesture on a display of the device, where the gesture on the display of the device is produced by a second user, and where the measuring includes at least one of:
      measuring a duration of time to complete the gesture,
      measuring a size of a finger used for the gesture,
      measuring a speed of a finger movement associated with the gesture,
      measuring changes in capacitance of the display based on the gesture,
      determining a shape of a finger for each touch in connection with the gesture,
      measuring distances between fingers used to make the gesture, or
      obtaining a three-dimensional image of a finger used to make the gesture;
   selectively decrypting, using the device, the encrypted data based on the measured one or more parameters, and based on determining the gesture on the display of the device substantially matches the gesture on the display of the second device; and
   displaying the decrypted data on the display of the device in a decrypted format.

8. The method of claim 7, where the gesture includes at least one of:
   a gesture formed using one finger, a gesture formed using two fingers, a continuous gesture, or a discontinuous gesture.

9. The method of claim 7, where a level of encryption is based on a complexity of the gesture.

10. The method of claim 7, further comprising:
    deleting the encrypted data from the second device, if the second device fails to detect the second gesture within the predetermined period of time.

11. The method of claim 7, where the one or more parameters associated with the gesture are used to generate a decryption key.

12. The method of claim 11, where selectively decrypting the encrypted data, based on the measured one or more parameters, further comprises:
    comparing the decryption key to an encryption key used to encrypt the encrypted data.

13. A device comprising:
    a surface;
    a memory to store a set of one or more gestures associated with decrypting information; and
    a processor to:
       detect one or more touches on a remote device,
       receive, in response to the one or more touches, encrypted information from the remote device, where the encrypted information is encrypted based on one or more parameters associated with a gesture produced by a first user on a surface of the remote device,
       initiate storage of the encrypted information for a predetermined period of time,
       identify a gesture on the surface of the device, where the gesture on the surface of the device is produced by a second user,
       decrypt the information based on a comparison of the gesture on the surface to the set of one or more gestures associated with decrypting information, and based on determining the gesture on the surface of the device substantially matches the gesture on the surface of the remote device, and
       provide the decrypted information in a decrypted format to the second user of the device based on the comparison.

14. The device of claim 13, where the remote device includes one of a passive RFID tag or an active RFID tag.

15. The device of claim 13, where the processor further is to:
    identify a link in the decrypted information;
    download data from a location associated with the link; and
    provide the data to the second user.

16. The device of claim 13, where the surface is a touch screen.

17. The device of claim 13, where the processor further is to:
    delete the encrypted information from the device, if the device fails to detect the gesture within the predetermined period of time.

18. The device of claim 13, where the gesture includes at least one of:
    a gesture formed using one finger,
    a gesture formed using two fingers,
    a continuous gesture, or
    a discontinuous gesture.

19. The device of claim 13, further comprising:
    a RFID receiver for receiving the encrypted information.

20. The device of claim 15, where the processor further is further to:
    transfer a payment to an account in exchange for receiving the data.

* * * * *